United States Patent
Kishinami et al.

(10) Patent No.: US 9,253,557 B2
(45) Date of Patent: Feb. 2, 2016

(54) ELECTRONIC DEVICE

(75) Inventors: Yuichiro Kishinami, Kanagawa (JP); Yasuharu Onishi, Kanagawa (JP); Motoyoshi Komoda, Kanagawa (JP); Nobuhiro Kawashima, Kanagawa (JP); Yukio Murata, Kanagawa (JP); Jun Kuroda, Kanagawa (JP); Shigeo Satou, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 13/824,121

(22) PCT Filed: Sep. 9, 2011

(86) PCT No.: PCT/JP2011/005068
§ 371 (c)(1),
(2), (4) Date: Apr. 18, 2013

(87) PCT Pub. No.: WO2012/060044
PCT Pub. Date: May 10, 2012

(65) Prior Publication Data
US 2013/0216082 A1 Aug. 22, 2013

(30) Foreign Application Priority Data
Nov. 1, 2010 (JP) .................................. 2010-245678

(51) Int. Cl.
*H04R 1/02* (2006.01)
*H04M 1/03* (2006.01)
(Continued)

(52) U.S. Cl.
CPC ................ *H04R 1/021* (2013.01); *H04M 1/035* (2013.01); *H04R 1/345* (2013.01); *H04R 17/00* (2013.01); *H04R 2217/03* (2013.01); *H04R 2499/11* (2013.01)

(58) Field of Classification Search
USPC ......... 381/111, 160, 173, 190, 311, 316, 320; 455/569.1, 575.3, 575.4
See application file for complete search history.

(56) References Cited

U.S. PATENT DOCUMENTS 6,631,191 B1 10/2003 Holmberg
8,078,239 B2 * 12/2011 Numano ............. H04M 1/0235
379/420.01

(Continued)

FOREIGN PATENT DOCUMENTS

CN 1943268 A 4/2007
JP 62-200998 A 9/1987
(Continued)

OTHER PUBLICATIONS

International Search Report dated Oct. 11, 2011 issued by the International Searching Authority in corresponding Application No. PCT/JP2011/005068 English.

(Continued)

*Primary Examiner* — Vivian Chin
*Assistant Examiner* — Friedrich W Fahnert
(74) *Attorney, Agent, or Firm* — Sughrue Mion, PLLC

(57) ABSTRACT

Disclosed is an electronic device including: a housing (110) in which at least one sound hole (113) and at least one sound hole (114) are formed; an oscillator (120) that is provided inside the housing (110) and outputs a modulated wave for a parametric loudspeaker; a sound demodulation unit (130) that is not provided in the sound hole (113) but provided in the sound hole (114) and demodulates the modulated wave; and a sound hole opening and closing unit (112) that is mounted to the housing (110) and opens and closes the sound hole (113).

12 Claims, 7 Drawing Sheets

(51) Int. Cl.
*H04R 1/34* (2006.01)
*H04R 17/00* (2006.01)

(56) References Cited

U.S. PATENT DOCUMENTS

| | | | |
|---|---|---|---|
| 2005/0149338 A1 | 7/2005 | Fukui | |
| 2007/0280497 A1* | 12/2007 | Isberg et al. | ............... 381/345 |
| 2010/0246863 A1* | 9/2010 | Onishi | ............... H04R 17/00 381/190 |
| 2011/0064250 A1* | 3/2011 | Jeong et al. | ............... 381/186 |

FOREIGN PATENT DOCUMENTS

| | | |
|---|---|---|
| JP | 63-78494 U | 5/1988 |
| JP | 4-74097 A | 3/1992 |
| JP | 4-351099 A | 12/1992 |
| JP | 2000-025533 A | 1/2000 |
| JP | 2001-285433 A | 10/2001 |
| JP | 2002-537742 A1 | 11/2002 |
| JP | 2004-312395 A | 11/2004 |
| JP | 2006-067386 A | 3/2006 |
| JP | 2006-157199 A | 6/2006 |

OTHER PUBLICATIONS

Extended European Search Report, dated Apr. 22, 2014, issued by the European Patent Office, in counterpart Application No. 11837699.5.
Communication dated Feb. 6, 2015 from the State Intellectual Property Office of People's Republic of China in counterpart application No. 201180051994.4.

* cited by examiner

ELECTRONIC DEVICE

CROSS REFERENCE TO RELATED APPLICATIONS

This application is a National Stage of International Application No. PCT/JP2011/005068 filed on Sep. 9, 2011, which claims priority from Japanese Patent Application No. 2010-245678, filed on Nov. 1, 2010, the contents of all of which are incorporated herein by reference in their entirety.

TECHNICAL FIELD

The present invention relates to an electronic device provided with an oscillator.

BACKGROUND ART

Recently, a parametric loudspeaker that demodulates an ultrasonic wave passed through amplitude modulation (AM) or frequency modulation (FM) by using a density phenomenon of air to reproduce audible sound has been developed.

In the parametric loudspeaker, the ultrasonic wave is used. Thus, it is possible to realize an audio device with a high directionality. With the audio device with the high directionality, for example, it is possible to propagate sound to only a specific user, thereby making it possible to provide saleability such as privacy protection. Further, for example, it is possible to provide a function of propagating sound to only a specific position.

In order to control an output direction of a sound output from the parametric loudspeaker, a phased array method is used, for example. In the phased array method, ultrasonic waves oscillated according to a change in timing from an array vibrator in which a plurality of ultrasonic wave vibrators is arranged are combined to oscillate a main beam.

Recently, as a mobile phone as mentioned above, various techniques have been proposed (Patent Documents 1 and 2).

RELATED DOCUMENT

Patent Document

[Patent Document 1] Japanese Unexamined Patent Publication NO. 2001-285433
[Patent Document 2] Japanese Unexamined Patent Publication NO. 2006-157199

DISCLOSURE OF THE INVENTION

In order to control the output direction of the sound output in the parametric loudspeaker, for example, a technique of controlling the phases of ultrasonic waves output from a plurality of oscillators arranged in an array form may be considered. However, in this case, it is necessary to secure an area for mounting of the plurality of oscillators arranged in the array form. Thus, in an electronic device mounted with the oscillators, it is difficult to achieve a small size.

In order to solve the above-mentioned problem, an object of the invention is to provide an electronic device that is capable of controlling an output direction of a sound output from a parametric loudspeaker while achieving a reduction in size.

In one embodiment, there is provided an electronic device including: a housing in which at least one first sound hole and at least one second sound hole are formed; an oscillator that is provided inside the housing and outputs a modulated wave for a parametric loudspeaker; a sound demodulation unit that is not provided in the first sound hole but provided in the second sound hole and demodulates the modulated wave; and a sound hole opening and closing unit that is mounted to the housing and opens and closes the first sound hole.

According to the invention, it is possible to provide an electronic device capable of controlling an output direction of a sound output in a parametric loudspeaker while achieving reduction in size.

BRIEF DESCRIPTION OF THE DRAWINGS

The above and other objects, advantages and features of the present invention will be more apparent from the following description of certain preferred embodiments taken in conjunction with the accompanying drawings.

DESCRIPTION OF EMBODIMENTS

Figure 1:
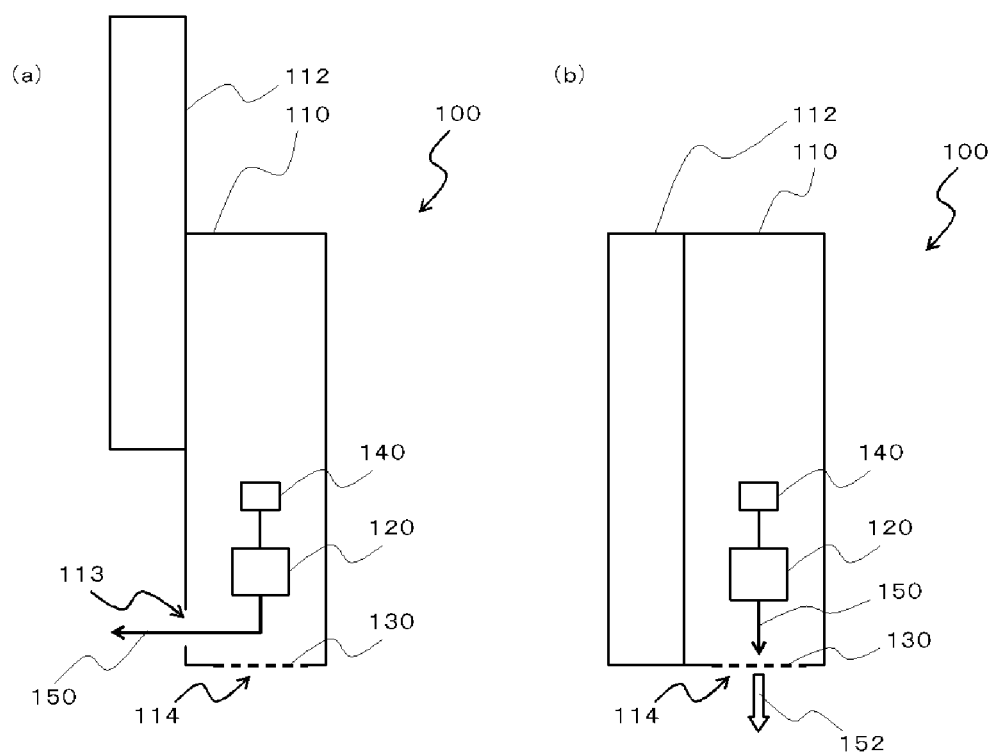
FIG. 1 is a longitudinal sectional side view schematically illustrating an internal structure of an electronic device according to an embodiment of the invention.

An embodiment of the invention will be described with reference to the accompanying drawings. FIG. 1 is a longitudinal sectional side view schematically illustrating an internal structure of an electronic device 100 according to the present embodiment.

The electronic device 100 of the present embodiment includes a housing 110 provided with at least one sound hole 113 and at least one sound hole 114, an oscillator 120 that is disposed in the housing 110 and outputs a modulated wave for a parametric loudspeaker, a sound demodulating unit 130 that is not mounted in the sound hole 113 but mounted in the sound hole 114 and demodulates the modulated wave, and a sound hole opening and closing unit 112 that is mounted in the housing 110 and opens and closes the sound hole 113 as shown in FIG. 1.

The electronic device 100 is a mobile communication terminal such as a mobile phone or the like, for example.

As shown in FIG. 1, the sound hole opening and closing unit 112 is fixed on an outer surface of the housing 110. Further, the sound hole opening and closing unit 112 is provided to be able to slide with respect to the housing. In the electronic device 100 according to the present embodiment, as the sound hole opening and closing unit 112 slides with respect to the housing 110, the sound hole 113 is opened and closed. That is, as the sound hole opening and closing unit slides, it is possible to switch a state where the sound hole 113 is opened (see FIG. 1(a)) and a state where the sound hole 113 is closed (see FIG. 1(b)).

In a case where the electronic device 100 is a mobile phone, the sound hole opening and closing unit 112 may be formed by a housing part that has a display or the like, for example.

As shown in FIG. 1, the sound hole 113 and the sound hole 114 are provided in the housing 110. A plurality of sound holes 113 and a plurality of sound holes 114 may be provided, respectively, for example.

Figure 7:
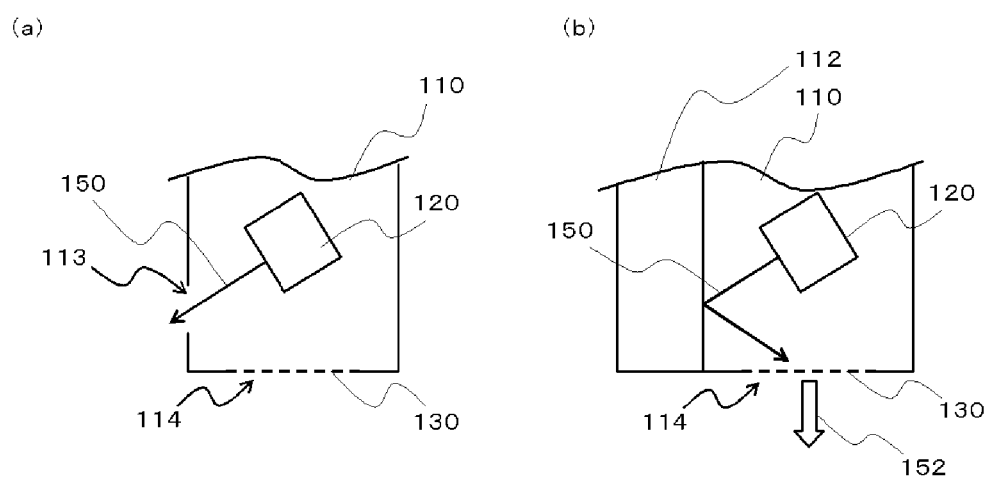
FIG. 7 is a longitudinal sectional side view schematically illustrating an internal structure of a housing shown in FIG. 1.

The sound hole 114 is provided to face a vibration surface of the oscillator 120, for example. As shown in FIG. 7, to be described later, the sound hole 114 may not be provided to face the vibration surface of the oscillator 120, for example. Further, the sound hole 114 is provided on an end surface of the housing 110, for example. The sound hole 113 is provided to be close to the surface in which the sound hole 114 is provided, among the surfaces orthogonal to the surface in which the sound hole 114 is provided, for example.

The sound demodulating unit 130 that demodulates the modulated wave is mounted in the sound hole 114. Further, the sound demodulating unit 130 is not mounted in the sound hole 113. The sound demodulating unit 130 is formed by a sound filter that demodulates an ultrasonic wave 150 modulated for the parametric loudspeaker and generates an audible sound wave 152, for example.

In a case where the electronic device 100 is the mobile phone, the sound hole 113 is provided on a front surface of the housing 110 provided with an input key or the like, for example. Further, the sound hole 114 is provided on a lower surface of the housing 110, for example.

As shown in FIG. 1, the oscillator 120, the sound demodulating unit 130, and a driver circuit 140 are mounted in the housing 110.

The driver circuit 140 functions as an oscillator drive unit that outputs a sound wave to the oscillator 120. The driver circuit 140 is connected to the oscillator 120 through a printed interconnection or a lead wire, for example (not shown).

The oscillator 120 outputs the ultrasonic wave 150 modulated for the parametric loudspeaker, for example. The oscillator 120 outputs an ultrasonic wave having an oscillation frequency of equal to or higher than 20 kHz, for example. The oscillator 120 may be configured to output a sound wave having a frequency of audible range, for example.

Figure 4:
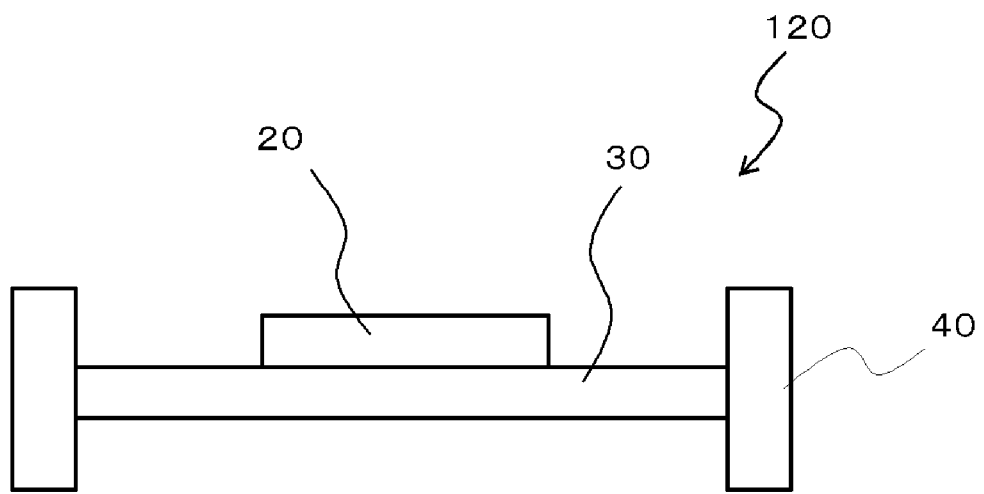
FIG. 4 is a longitudinal sectional front view schematically illustrating a structure of an oscillator shown in FIG. 1.

FIG. 4 is a longitudinal sectional front view schematically illustrating a structure of the oscillator 120 shown in FIG. 1. As shown in FIG. 4, the oscillator 120 includes a piezoelectric element 20, a vibration member 30 that binds one surface of the piezoelectric element 20, and a support member 40 that supports the vibration member 30, for example.

The piezoelectric element 20 is formed to have a disk shape, for example. The planar shape of the piezoelectric element 20 may be circular, oval, polygonal or the like, for example.

The vibration member 30 is formed to have a disk shape, for example. The planar shape of the vibration member 30 may be circular, oval, polygonal or the like, for example. The vibration member 30 is formed of metal, resin or the like, for example.

As shown in FIG. 4, the support member 40 fixes the outer circumference of the vibration member 30 to support the vibration member 30. The support member 40 is formed to be tubular, for example.

Figure 5:
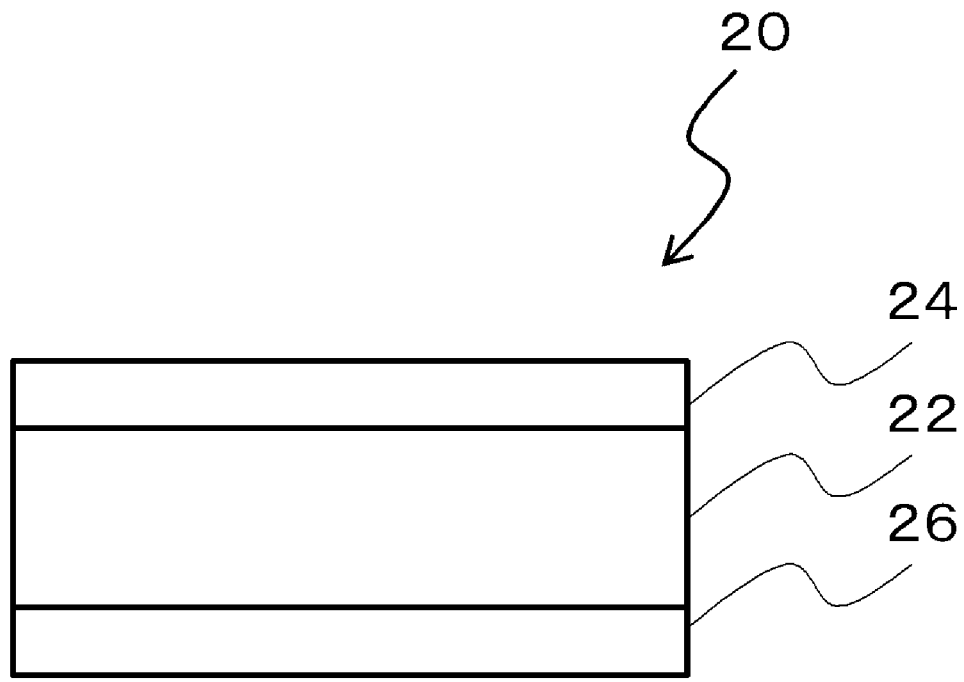
FIG. 5 is a longitudinal sectional front view schematically illustrating a piezoelectric element shown in FIG. 4.

FIG. 5 is a longitudinal sectional front view schematically illustrating the piezoelectric element 20 shown in FIG. 4. As shown in FIG. 5, the piezoelectric element 20 includes a piezoelectric layer 22, an upper electrode 24 and a lower electrode 26.

The piezoelectric layer 22 is interposed between the upper electrode 24 and the lower electrode 26. Further, the piezoelectric layer 22 is polarized in the thickness direction.

In the present embodiment, as shown in FIG. 1, by opening and closing the sound hole 113 by the sound hole opening and closing unit 112, an output direction of a sound output of the electronic device 100 is controlled.

As shown in FIG. 1(a), in a state where the sound hole 113 is opened, the ultrasonic wave 150 output from the oscillator 120 is output to the outside of the housing 110 through the sound hole 113.

On the other hand, as shown in FIG. 1(b), in a state where the sound hole 113 is closed, the ultrasonic wave 150 is not output through the sound hole 113, and is output to the outside of the housing 110 through the sound hole 114. The sound demodulating unit 130 is provided in the sound hole 114. Thus, the ultrasonic wave 150 passed through the sound hole 114 is demodulated by the sound demodulating unit 130. Thus, the audible sound wave 152 is output through the sound hole 114.

In this way, it is possible to control the sound output direction of the electronic device 100. Here, in a case where the sound hole 113 is opened, the ultrasonic wave 150 may be output through only the sound hole 113, or may be output through the sound hole 113 and the sound hole 114. This configuration may be selected according to a structure design in consideration of reflectance or the like of the sound demodulating unit 130.

Figure 2:
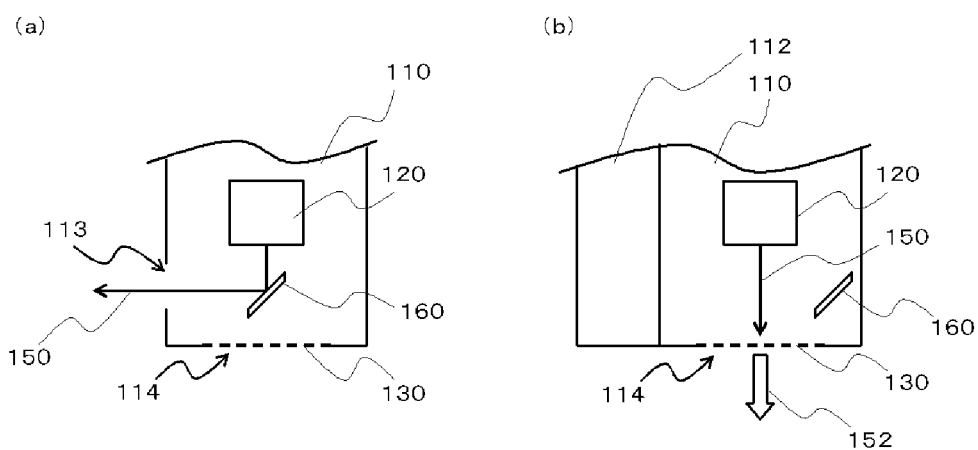
FIG. 2 is a longitudinal sectional side view schematically illustrating an internal structure of a housing shown in FIG. 1.

FIG. 2 is a longitudinal sectional side view schematically illustrating an internal structure of the housing 110 shown in FIG. 1, which illustrates a control example of the sound output direction. Hereinafter, the control example of the sound output direction will be described in detail with reference to FIG. 2.

As shown in FIG. 2, the electronic device 100 includes a reflective film 160 that is disposed between the oscillator 120 and the sound hole 114, for example. The reflective film 160 moves according to opening and closing of the sound hole 113. That is, in a state where the sound hole 113 is closed, the reflective film 160 is disposed at a position where the ultrasonic wave 150 is not contacted therewith, and in a state where the sound hole 113 is opened, the reflective film 160 is disposed at a position where the ultrasonic wave 150 is contacted therewith.

First, as shown in FIG. 2, the ultrasonic wave modulated for the parametric loudspeaker is output from the oscillator 120 toward the sound hole 114. A wave guide path through which the ultrasonic wave passes may be formed between the oscillator 120 and the sound hole 114.

As shown in FIG. 2(a), in a state where the sound hole 113 is opened, the ultrasonic wave 150 output from the oscillator 120 is reflected by the reflective film 160 toward the sound hole 113. At this time, the ultrasonic wave 150 is output through the sound hole 113, and is not output through the sound hole 114. A wave guide path through which the ultrasonic wave 150 passes may be formed between the reflective film 160 and the sound hole 113.

On the other hand, as shown in FIG. 2(b), in a state where the sound hole 113 is closed, the ultrasonic wave 150 is not reflected by the reflective film 160. At this time, the ultrasonic wave 150 is not output through the sound hole 113, and is output through the sound hole 114.

According to the present embodiment, it is possible to control the sound output direction of the electronic device 100 in this way.

Figure 3:
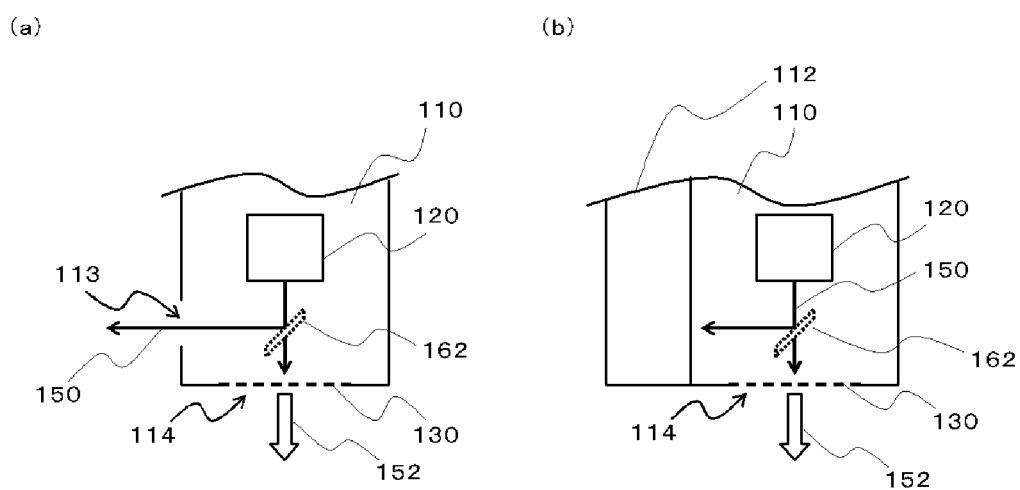
FIG. 3 is a longitudinal sectional side view schematically illustrating an internal structure of a housing shown in FIG. 1.

FIG. 3 is a longitudinal sectional side view schematically illustrating an internal structure of the housing 100 shown in FIG. 1. FIG. 3 is a diagram illustrating a control example of the sound output direction, which is different from that in FIG. 2. Hereinafter, the control example of the sound output direction will be described in detail with reference to FIG. 3.

As shown in FIG. 3, the electronic device 100 includes a semi-permeable membrane 162 provided between the oscillator 120 and the sound hole 114, for example. The semi-permeable membrane 162 reflects apart of the ultrasonic wave output from the oscillator 120, and transmits the other part thereof. The reflectance that the semi-permeable membrane 162 reflects the ultrasonic wave 150 may be randomly determined. Further, the semi-permeable membrane 162 may be formed by the sound demodulating unit 130, for example.

First, as shown in FIG. 3, the ultrasonic wave modulated for the parametric loudspeaker is output from the oscillator 120 to the sound hole 114. A part of the ultrasonic wave 150 is reflected from the semi-permeable membrane 162 toward the sound hole 113. The other part of the ultrasonic wave 150 passes through the semi-permeable membrane 162.

As shown in FIG. 3(a), in a state where the sound hole 113 is opened, the ultrasonic wave 150 reflected from the semi-permeable membrane 162 is output through the sound hole 113. Further, the ultrasonic wave 150 passed through the semi-permeable membrane 162 is output through the sound hole 114.

On the other hand, as shown in FIG. 3(b), in a state where the sound hole 113 is closed, the ultrasonic wave 150 reflected from the semi-permeable membrane 162 is not output through the sound hole 113. At this time, the ultrasonic wave 150 passed through the semi-permeable membrane 162 is output through the sound hole 114.

According to the present embodiment, it is possible to control the output direction of the sound output in this way.

FIG. 7 is a longitudinal sectional side view schematically illustrating an internal structure of the housing 110 shown in FIG. 1, which illustrates a control example of the sound output direction different from those in FIGS. 2 and 3. Hereinafter, the control example of the sound output direction will be described in detail with reference to FIG. 7.

In the example shown in FIG. 7, the vibration surface of the oscillator 120 faces the sound hole 113. The position of the oscillator 120 is designed so that in a state where the sound hole 113 is closed, the ultrasonic wave 150 output from the oscillator 120 is reflected from the closed sound hole 113 and proceeds to the sound hole 114.

First, as shown in FIG. 7, the ultrasonic wave 150 modulated for the parametric loudspeaker is output from the oscillator 120 toward the sound hole 113.

As shown in FIG. 7(a), in a state where the sound hole 113 is opened, the ultrasonic wave 150 output from the oscillator 120 is output through the sound hole 113.

On the other hand, as shown in FIG. 7(b), in a state where the sound hole 113 is closed, the ultrasonic wave 150 is reflected from the closed sound hole 113 and proceeds to the sound hole 114. Thus, in a state where the sound hole 113 is closed, the ultrasonic wave 150 is output through the sound hole 114.

According to the present embodiment, it is possible to control the sound output direction of the electronic device 100 in this way.

Next, effects of the present embodiment will be described.

The electronic device 100 according to the present embodiment includes the sound hole opening and closing unit 112 that opens and closes the sound hole 113 among the sound hole 113 and the sound hole 114 provided in the housing 110. Further, according to the present embodiment, it is possible to control the direction where the ultrasonic wave 150 is output by opening and closing of the sound hole 113. That is, it is possible to control the sound output direction of the electronic device 100 without providing a plurality of oscillators.

Accordingly, it is possible to provide an electronic device capable of controlling the output direction of the sound output in the parametric loudspeaker while achieving a reduction in size.

Further, in a case where the electronic device 100 is a mobile phone, the sound hole opening and closing unit 112 may be formed by a portion of the housing that is provided with a display or the like, for example. Thus, it is possible to open and close the sound hole 113 using an existing slide structure of the mobile phone.

The invention is not limited to the present embodiment, and various modifications are allowed in the range without departing from the spirit of the invention. In the above-described embodiment, an example in which the sound hole opening and closing unit 112 is able to slide with respect to the housing has been described.

Figure 6:
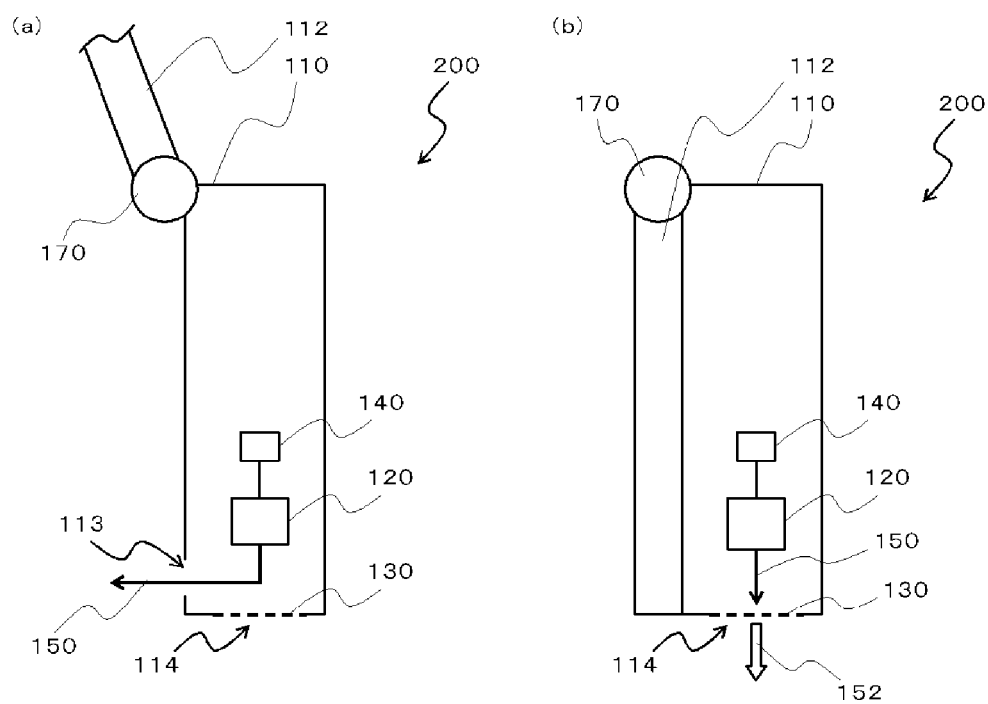
FIG. 6 is a longitudinal sectional side view schematically illustrating a modification example of an electronic device shown in FIG. 1.

FIG. 6 is a longitudinal sectional side view schematically illustrating an electronic device 200 according to a modification example of the electronic device 100 shown in FIG. 1. In the present embodiment, a structure shown in the modification example may be provided.

As shown in FIG. 6, in the electronic device 200, the sound hole opening and closing unit 112 is fixed to a rotating shaft 170 provided on an outer surface of the housing 110, and is able to rotate around the rotating shaft 170. Further, as the sound hole opening and closing unit 112 rotates, the sound hole 113 is opened and closed.

Further, in the above-described embodiment, an example in which the oscillator 120 of a unimorph structure binds only the upper surface of the vibration member 30 by one piezoelectric element 20 has been described. However, it is possible to realize an oscillator of a bimorph structure that binds the upper surface and the lower surface of the vibration member 30 by two piezoelectric elements 20 (not shown).

Further, in the above-described embodiment, the piezoelectric element 20 is formed by one piezoelectric layer 22. However, the piezoelectric element 20 may have a stacked structure in which a piezoelectric layer and an electrode layer are alternately stacked (not shown).

Further, in the above-described embodiment, an example in which the sound filter is used as the sound demodulating unit 130 has been described. However, the sound demodulating unit 130 is not limited to the sound filter, and for example, may be realized by forming a plurality of fine air holes in the housing 110.

Further, in the above-described embodiment, an example in which the mobile phone is used as the electronic device 100 has been described. However, it is possible to use a personal digital assistant (PDA), an electronic dictionary, an electronic organizer, an electronic book reader or the like as the electronic device 100 (not shown).

The above-described embodiment and a plurality of modification examples may be combined with each other in a range where the contents thereof do not conflict with each other. Further, in the above-described embodiment and modification examples, structures or the like of the respective units have been specifically described, but the structures or the like may be changed in a range where the invention is satisfied.

This application is based on Japanese patent application NO. 2010-245678, filed on Nov. 1, 2010, the content of which is incorporated hereinto by reference.

The invention claimed is:

1. An electronic device comprising:
   a housing in which at least one first sound hole and at least one second sound hole are formed;
   an oscillator that is provided inside the housing and outputs a modulated wave for a parametric loudspeaker;

a sound demodulation unit that is not provided in the first sound hole but provided in the second sound hole and configured to demodulate the modulated wave; and a sound hole opening and closing unit that is mounted to the housing and opens and closes the first sound hole.

2. The electronic device according to claim 1, wherein the sound hole opening and closing unit is fixed on an outer surface of the housing and is able to slide with respect to the housing, and wherein as the sound hole opening and closing unit slides with respect to the housing, the first sound hole is opened and closed.

3. The electronic device according to claim 1, wherein the sound hole opening and closing unit is fixed to a rotating shaft provided on an outer surface of the housing and is able to mutually rotate around the rotating shaft, and wherein as the sound hole opening and closing unit rotates, the first sound hole is opened and closed.

4. The electronic device according to claim 1, wherein an oscillation frequency of the ultrasonic wave in the parametric loudspeaker is equal to or higher than 20 kHz.

5. The electronic device according to claim 1, wherein the piezoelectric element has a stacking structure in which a piezoelectric layer and an electrode layer is alternately stacked.

6. The electronic device according to claim 1, wherein the electronic device is provided as a mobile phone.

7. An electronic device comprising:

a housing in which at least one first sound hole and at least one second sound hole are formed;

an oscillator that is provided inside the housing and outputs a modulated wave for a parametric loudspeaker;

a sound demodulation unit that is not provided in the first sound hole but provided in the second sound hole and configured to demodulate the modulated wave;

a sound hole opening and closing unit that is mounted to the housing and opens and closes the first sound hole; and a semi-permeable membrane that is disposed between the oscillator and the second sound hole, wherein a part of the modulated wave output from the oscillator that is reflected from the semi-permeable membrane is output through the first sound hole, and the other part thereof that passes through the semi-permeable membrane is output through the second sound hole.

8. The electronic device according to claim 7, wherein the sound hole opening and closing unit is fixed on an outer surface of the housing and is able to slide with respect to the housing, and wherein as the sound hole opening and closing unit slides with respect to the housing, the first sound hole is opened and closed.

9. The electronic device according to claim 7, wherein the sound hole opening and closing unit is fixed to a rotating shaft provided on an outer surface of the housing and is able to mutually rotate around the rotating shaft, and wherein as the sound hole opening and closing unit rotates, the first sound hole is opened and closed.

10. The electronic device according to claim 7, wherein an oscillation frequency of the ultrasonic wave in the parametric loudspeaker is equal to or higher than 20 kHz.

11. The electronic device according to claim 7, wherein the piezoelectric element has a stacking structure in which a piezoelectric layer and an electrode layer are alternately stacked.

12. The electronic device according to claim 7, wherein the electronic device is provided as a mobile phone.

\* \* \* \* \*